No. 869,629. PATENTED OCT. 29, 1907.
F. FLEMING.
JOURNAL BEARING.
APPLICATION FILED MAY 28, 1907.
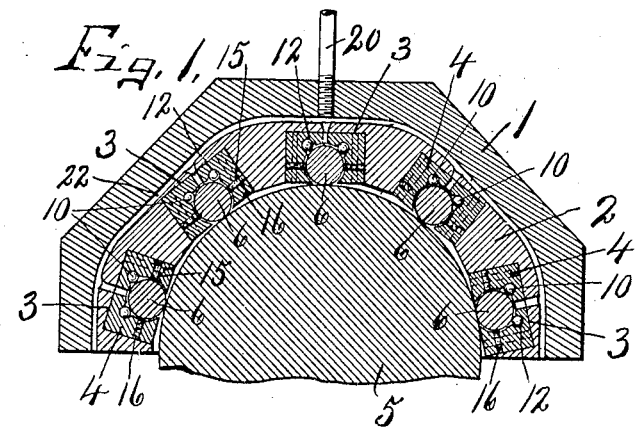
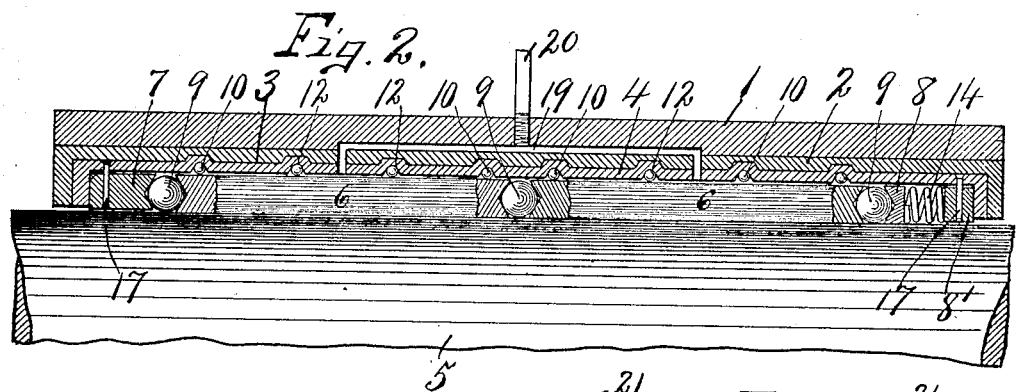
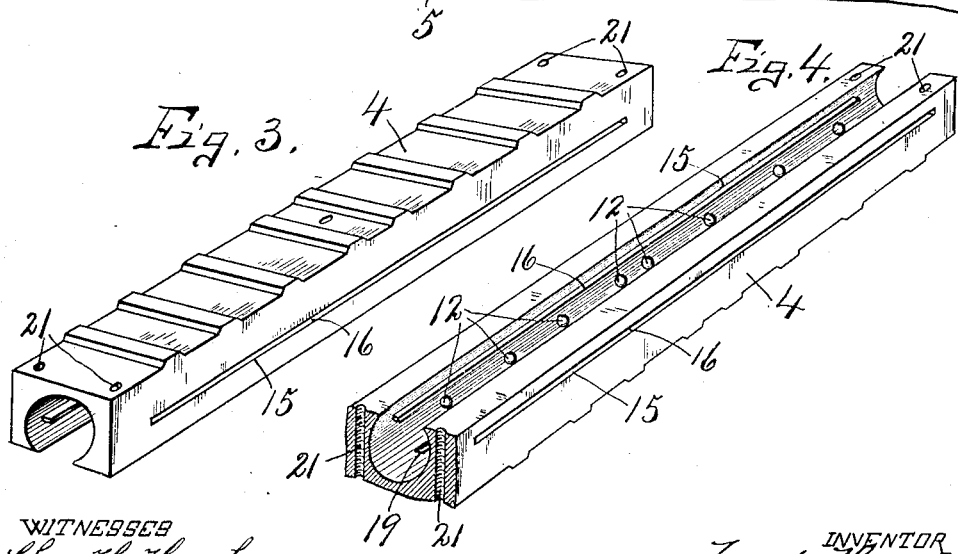
WITNESSES
Chas. H. Hughes.
W. E. Chase
INVENTOR
Frank Fleming
BY
Howard P. Denison
ATTORNEY

UNITED STATES PATENT OFFICE.

FRANK FLEMING, OF ROME, NEW YORK.

JOURNAL-BEARING.

No. 869,629.  Specification of Letters Patent.  Patented Oct. 29, 1907.

Application filed May 28, 1907. Serial No. 376,132.

*To all whom it may concern:*

Be it known that I, FRANK FLEMING, of Rome, in the county of Oneida, in the State of New York, have invented new and useful Improvements in Journal-Bearings, of which the following, taken in connection with the accompanying drawings, is a full, clear, and exact description.

This invention relates to certain improvements in journal bearings of the roller-bearing type adapted to receive any revolving element, and is particularly useful in connection with trucks, wrist-pins and other parts of locomotives and other heavy cars or trucks.

The main object is to provide the bearing with a plurality of co-axial friction rollers with interposed anti-friction end-thrust bearings between the ends of the rollers and means for automatically centering the anti-friction rollers and balls co-axially with each other for the purpose of keeping the rollers in exact co-axial lines, thereby preventing any liability of twisting.

A further object is to provide means for distributing oil to the several rollers. And a still further object is to separate each co-axial series of rollers and their end-thrust bearings with separate casings or boxes, which serve as retainers, and constitute with the inclosed bearings, a separate article of manufacture capable of being made up and sold as a unit, and readily placed in suitable numbers in any journal box which it may be desired to equip with said bearings.

A still further object is to provide means whereby the bearing retainers may be readily removed from their seats in the journal boxes when worn or otherwise rendered unfit for further use.

Other objects and uses will be brought out in the following description.

In the drawings—Figure 1 is a transverse vertical sectional view of a journal bearing embodying the features of my invention. Fig. 2 is a longitudinal sectional view through the same. Fig. 3 is a perspective view of one of the detached retainer frames. Fig. 4 is a perspective view similar to Fig. 3 of the retainer frame showing the open side, one end being in section.

This journal bearing comprises essentially a box or casing —1— of any suitable form, size or material, such as brass or iron having an inner lining —2— of Babbitt metal which is formed with a plurality of, in this instance five, lengthwise angular seats or pockets —3— for receiving and retaining a corresponding number of roller and ball-retaining frames —4— of substantially the same size and form as the pockets, said retainer frames being arranged concentrically about the axis of a rotating member, as a shaft 5. These pockets or recesses —3— are in this instance, rectangular in cross section, and the retainer frames —4— are also rectangular in cross-section, but are of slightly less length than the lining —2— in which they are seated, and which lap over the ends of the retainer frames —4— to prevent endwise movement of the latter.

Inasmuch as the retainer frames —4— are substantially identical in construction, I will proceed to describe only one of them which consists of a hollow box-like body of suitable metal open at its inner side facing the shaft —5— for receiving a series of anti-friction rollers —6— and fixed heads —7— and —8—, together with anti-friction balls —9— and 10—, as hereinafter described.

The anti-friction rollers —6—, end-heads —7— and 8 and anti-friction balls —9— are co-axial; that is, they are arranged end to end, the anti-friction balls —9— being interposed between the adjacent end faces of the rollers —6 and heads —7— and —8—, which adjacent end faces are preferably counter-bored or concave to receive the adjacent spherical faces of the balls —9—, the latter being of substantially the same diameter as the rollers —6—, although the fixed end heads —7— and —8— are of slightly less diameter than the rollers —6— to clear the revolving shaft —5— and avoid undue friction so that the entire bearing of the shaft is upon the rollers —6— and balls —9—.

The anti-friction balls —10— are seated in suitable sockets or pockets —12— in the outer side of the retainer-frame —4— and are preferably arranged in pairs circumferentially around and in contact with the periphery of the rollers —6—, and in practice I usually provide one pair of these anti-friction roller-bearings —10— for each end of each roller —6— and one pair for the center, but as many more will be employed as necessary, according to the length of the rollers or load to which the bearings are subjected.

A coil-spring 14— is interposed between the end heads —8— —8′— to exert a sufficient end thrust or axial pressure upon said rollers —6— and intervening balls —9— to take up wear, but essentially for the purpose of centering the balls and rollers and keeping them co-axial with each other and parallel to the axis of the revolving element, as the shaft —5—.

The retainer frame —4— is also provided with slots 15— at diametrically opposite sides of the rollers —6— for receiving flexible strips 16— of felt, leather or other similar material which bear against the opposite faces of the rollers —6— to prevent the entrance of dust to the ball bearings 10—, and also to remove the dust or grit from the surface of said rollers.

The heads —7— and 8′— are preferably fastened to the retainer-frames —4— by pins 17—, and as previously stated, said heads —7—, —8— and 8′— are preferably of less diameter than the rollers —6— and balls —9— so as to clear the shaft —5— and avoid friction therewith. This frame —4— is also provided with a lengthwise oil channel —19— terminating short of the ends of the frame, but of sufficient length to distribute the oil to all of the rollers —6— and ball-bearings —9—, said oil channel communicating with an oil supply pipe —20— leading radially and outwardly through the journal-box or outer casing —1—, and may be provided with the usual cup, not shown.

It is sometimes necesssary to remove these retainer frames —4— to gain access to the rollers and ball bearings for repairs or replacement, and for this purpose I provide said frame with one or more pairs of threaded apertures 21— into which screws, not shown, may be inserted to engage the outer sides of the pockets —3— of the lining —2— or shell —1, whereby the retainer frames may be forced inwardly from said pockets until sufficiently loose to remove them by hand, such operation being effected, of course, after the box —1— has been removed from its supporting frame, not shown, or also from the shaft —5—.

The outer box —1— or lining —2— is, in this instance, provided with a transverse oil groove —22— leading from the inner end of the oil-supply pipe —20— and communicating with the channels 19— in the several retainer frames —4— for the purpose of distributing oil to all of the roller and ball bearings simultaneously.

What I claim is:

1. In a journal bearing in combination with a revolving element and a stationary box, a plurality of retainer frames seated in the box and having open sides facing the revolving element, a plurality of co-axial rollers in each frame and interposed anti-friction balls between the ends of the rollers.

2. In a journal bearing, in combination with a revolving element and a non-rotatable box having a plurality of seats or pockets, a corresponding number of retainer frames seated in said pockets and having open sides facing the revolving element, a plurality of co-axial rollers in each frame interposed balls between the ends of the rollers, and yielding means for pressing said rollers and balls endwise into contact with each other.

3. A journal bearing comprising a box having a series of pockets arranged concentrically around a common center, a series of retainer frames seated in said pockets and having their open sides facing inwardly, a plurality of co-axial rollers in each frame and having concave seats in their end faces and anti-friction balls interposed between the meeting ends of the rollers and bearing in said seats.

4. A journal bearing comprising a box having a series of pockets arranged concentrically around a common center, a series of retainer frames seated in said pockets and having their open sides facing inwardly, a plurality of co-axial rollers in each frame and having concave seats in their end faces and anti-friction balls interposed between the meeting ends of the rollers and bearing in said seats, and a spring for pressing the rollers and balls axially into one direction to contact with each other at their contiguous faces for the purpose of taking up wear and keeping the rollers and balls in axial alinement.

5. In a journal bearing a box having an elongated pocket in its inner side, an elongated retainer frame loosely seated in said pocket and open at one side, a plurality of co-axial rollers and fixed heads at the outer ends of said rollers, anti-friction balls between the meeting ends of the rollers and heads, and means to press the rollers and balls axially to bring their adjacent faces in contact.

6. In a journal bearing a box having an elongated pocket on its inner side, a retainer-frame loosely seated in said pocket and open at one side, a roller and a co-axial fixed head, an anti friction ball between the meeting ends of the roller and fixed head and means for pressing the roller and ball toward the fixed head for maintaining contact between the adjacent ends of the roller, ball and head.

7. In a journal bearing, a retainer frame open at one side, a roller and a co-axial fixed head in the open side of the frame, said roller and head having concave recesses in their adjacent ends, an anti friction ball seated in said recesses, and yielding means pressing the roller and ball axially toward the fixed head.

In witness whereof I have hereunto set my hand this 16th day of May 1907.

FRANK FLEMING.

Witnesses:
H. E. CHASE,
C. M. McCORMACK.